(12) United States Patent
Heine et al.

(10) Patent No.: US 11,131,630 B2
(45) Date of Patent: Sep. 28, 2021

(54) METHOD OF ALIGNING A LASER-SCANNING FLUORESCENCE MICROSCOPE AND LASER-SCANNING FLUORESCENCE MICROSCOPE HAVING AN AUTOMATIC ALIGNING SYSTEM

(71) Applicant: Abberior Instruments GmbH, Goettingen (DE)

(72) Inventors: Joern Heine, Goettingen (DE); Matthias Reuss, Goettingen (DE); Benjamin Harke, Goettingen (DE); Lars Kastrup, Goettingen (DE)

(73) Assignee: ABBERIOR INSTRUMENTS GMBH, Goettingen (DE)

( * ) Notice: Subject to any disclaimer, the term of this patent is extended or adjusted under 35 U.S.C. 154(b) by 126 days.

(21) Appl. No.: 16/285,522

(22) Filed: Feb. 26, 2019

(65) Prior Publication Data

US 2019/0195800 A1 Jun. 27, 2019

Related U.S. Application Data

(63) Continuation of application No. PCT/EP2017/072262, filed on Sep. 5, 2017.

(30) Foreign Application Priority Data

Sep. 5, 2016 (EP) .................... 16187303

(51) Int. Cl.
*G01N 21/64* (2006.01)
*G01N 21/63* (2006.01)
*G02B 21/00* (2006.01)

(52) U.S. Cl.
CPC ....... *G01N 21/6458* (2013.01); *G01N 21/636* (2013.01); *G02B 21/008* (2013.01); *G02B 21/0072* (2013.01); *G02B 21/0076* (2013.01)

(58) Field of Classification Search
CPC ............. G01N 21/6458; G01N 21/636; G02B 21/0072; G02B 21/008; G02B 21/0076
See application file for complete search history.

(56) References Cited

U.S. PATENT DOCUMENTS

| 8,319,970 | B2 | 11/2012 | Birk et al. | |
| 2010/0006772 | A1* | 1/2010 | Gugel | G01N 21/636 250/459.1 |

(Continued)

FOREIGN PATENT DOCUMENTS

| DE | 10 2007 011 305 A1 | 9/2008 |
| JP | 2002-277746 A | 9/2002 |

OTHER PUBLICATIONS

Gould et al. Auto-aligning stimulated emission depletion microscope using adaptive optics, Optics Letters vol. 38, No. 11, pp. 1860-1862 (Year: 2013).*

(Continued)

*Primary Examiner* — David P Porta
*Assistant Examiner* — Shun Lee
(74) *Attorney, Agent, or Firm* — Thomas | Horstemeyer, LLP (57) ABSTRACT

For setting a laser-scanning fluorescence microscope to a correct alignment in which an intensity maximum of excitation light and an intensity minimum of fluorescence inhibition light coincide in a focal area of an objective lens, a structure in a sample marked with a fluorescent dye is scanned with the intensity maximum of the excitation light to generate first and second pictures of the sample, the first picture corresponding to a higher and the second picture corresponding to a lower intensity of the fluorescence inhibition light. A spatial offset of a first image of the structure in the first picture with regard to a second image of the structure in the second picture is calculated; and the intensity maximum of the excitation light is shifted with regard to the (Continued)

intensity minimum of the fluorescence inhibition light in the direction of the offset calculated to set the microscope to the correct alignment.

21 Claims, 5 Drawing Sheets

(56) References Cited

U.S. PATENT DOCUMENTS

2015/0226950 A1 8/2015 Booth et al.
2016/0161472 A1* 6/2016 Jungmann ............ C12Q 1/6841
 506/9

OTHER PUBLICATIONS

Machine translation of JP-2002277746-A (Year: 2002).*
T. J. Gould, et al.: Auto-aligning stimulated emission depletion microscope using adaptive optics, Optics Letters, vol. 38, No. 11 (2013) 1860-1862.
Egidijus Auksorius et al.: Stimulated emission depletion microscopy with a supercontinuum source and fluorescence lifetime imaging, Optics Letters, vol. 33, No. 2, Jan. 1, 2008, p. 113-115.
Johanna Bueckers et al.: "Simultaneous multi-lifetime multi-color STED imaging for colocalization analyses", Opt. Express, vol. 19, No. 4, Feb. 14, 2011, p. 3130-3143.
Monty Glass et al.: "The experimental effect of detector size on confocal lateral resolution", Journal of Microscopy, vol. 164, No. 2, Nov. 1, 1991, p. 153-158.
Yong Wu et al.: "Resonant-scanning dual-color STED microscopy with ultrafast photon counting: a concise guide", Methods, vol. 88, Oct. 1, 2015, p. 48-56.
Fabian Goettfert et al. "Coaligned Dual-Channel STED Nanoscopy and Molecular Diffusion Analysis at 20 nm Resolution", Biophysical Journal, vol. 105, No. 1, Jul. 1, 2013, p. 1-3.
Yifan Wang et al. "A 3D aligning method for stimulated emission depletion microscopy using fluorescence lifetime distribution", Microscopy Research and Technique., vol. 77, No. 11, Nov. 11, 2014, p. 935-940.
Richard W. Cole et al.: "Measuring and interpreting point spread functions to determine confocal microscope resolution and ensure quality control", Nature Protocols, vol. 6, No. 12, Nov. 10, 2011, p. 1929-1941.
Charmaine Tressler: "Alignment of a STED microscope using FCS", Thesis, Apr. 30, 2013, XP055369328, 011 Retrieved from the Internet: URL:https://macsphere.mcmaster.ca/bitstream/11375/12856/1/fulltext.pdf [retrieved on May 4, 2017].
International Preliminary Report on Patentability in co-pending, related PCT Application PCT/EP2017/072262, dated Mar. 5, 2019.

* cited by examiner

METHOD OF ALIGNING A LASER-SCANNING FLUORESCENCE MICROSCOPE AND LASER-SCANNING FLUORESCENCE MICROSCOPE HAVING AN AUTOMATIC ALIGNING SYSTEM

CROSS REFERENCE TO RELATED APPLICATIONS

This application is a continuation of International Application PCT/EP2017/072262 with an international filing date of Sep. 5, 2017 entitled "Method for adjusting a laser-scanning fluorescence microscope and laser-scanning fluorescence microscope having an automatic adjustment device" and claiming priority to co-pending European Patent Application No. EP 16 187 303.9 entitled "Method for adjusting a laser-scanning fluorescence microscope and laser-scanning fluorescence microscope having an automatic adjustment device" and filed on Sep. 5, 2016.

FIELD OF THE INVENTION

The present invention relates to a method of setting a laser-scanning fluorescence microscope to a correct alignment in which an intensity maximum of excitation light and at least one of an intensity minimum of fluorescence inhibition light and an image of a pinhole aperture arranged in front of a fluorescence light detector coincide in the focal area of an objective lens of the laser-scanning fluorescence microscope. Particularly, the present invention relates to such a method in which a metric is used for setting the laser-scanning fluorescence microscope to the correct alignment, the metric being calculated and allowing for an exact automatic alignment. Further, the present invention relates to a laser-scanning fluorescence microscope having an automatic aligning system for carrying out such a method.

Particularly, the laser-scanning fluorescence microscope may be a confocal microscope comprising a pinhole aperture arranged in front of a fluorescence light detector or a high resolution laser-scanning fluorescence microscope in which the spatial resolution is increased by fluorescence inhibition light having an intensity minimum. Such a high resolution laser-scanning microscope may also have a pinhole aperture arranged in front of a fluorescence light detector. The fluorescence inhibition light may particularly be so-called STED light or switching light which inhibits by stimulation of stimulated emission or by transfer into a dark state that a fluorescent dye emits fluorescence light.

BACKGROUND OF THE INVENTION

A conventional method and a method using a metric for aligning a STED laser-scanning fluorescence microscope so that an intensity minimum of focused STED light coincides with a center of focused excitation light are known from T. J. Gould, et al.: Auto-aligning stimulated emission depletion microscope using adaptive optics, optics letters, Vol. 38, No. 11 (2013) 1860-1862 and from US 2015/0226950 A1. In the conventional method, light scattered by gold particles is imaged, and the positions of the focuses of the STED light and the excitation light are shifted with regard to each other until their point spread functions are aligned. The conventional method requires switching the STED laser-scanning fluorescence microscope into a scattered light imaging mode and typically requires a manual setting of the positions of the focuses of the STED light and the excitation light. In the known method using a metric, the metric is calculated from the brightness and sharpness of STED images for different relative positions of the focuses of the STED light and the excitation light, and an optimum relative position is determined by the metric reaching a maximum value. Afterwards, a fine alignment may follow in which a second metric is used which is only depending on the brightness of the STED images. The second metric is based on the fact that STED images are the brightest if the position of the intensity maximum of the STED light is aligned with the center of the intensity maximum of the excitation light. Once again, an optimum relative position is determined by the second metric reaching a maximum value. For functional demonstration of the known method using the metric, confocal and STED pictures taken with the same laser-scanning fluorescence microscope prior and after the alignment using the metric are compared. Whereas the centers of images of fluorescent particles in the STED and confocal images differ in the pictures taken with the not yet adjusted microscope, these centers coincide in the pictures taken with the adjusted laser-scanning fluorescence microscope except of an offset of 4.3+/−2.3 nm. This value is commented in that it is far below the typical spatial resolution of most STED microscopes and that it does not display a preferred direction. For relatively shifting the focuses of the STED light and the excitation light, T. J. Gould, et al. propose the use of a spatial light modulator (SLM) arranged in the beam parts of the STED light.

A device and a method for beam adjustment in an optical beam path having at least two mutually independent light sources is known from German patent application publication DE 10 2007 011 305 A1 and U.S. Pat. No. 8,319,970 B2 belonging to the same patent family. This disclosure is particularly related to a common illumination beam path of a high resolution STED laser-scanning fluorescence microscope, in which the beams of the light sources are superimposed. A calibration sample which allows for checking the pupil position and/or the focal position of the beams is temporarily arranged in the common illumination beam path. Particularly, the calibration sample may be positioned at the site or in the vicinity of an intermediate image, and it may have a surface structure. At least one setting element for influencing the pupil and/or focus position of at least one of the beams to be merged is provided for adjustment purposes. The known beam adjustment using the calibration sample does not consider the influences of optical elements which are in the illumination beam path behind the calibration sample. In other words, the calibration sample only allows for an adjustment in the area of the intermediate image but not in the area of the focus of an objective lens, i.e. not within a sample to be actually measured.

From Egidijus Auksorius et al.: Stimulated emission depletion microscopy with a supercontinuum source and fluorescence lifetime imaging", OPTICS LETTERS, Vol. 33, No. 2, Jan. 1, 2008, p. 113-115 it is known that, if a delay between an excitation pulse and an STED pulse is selected such that a maximum spatial resolution in the generated STED images is achieved, the first fluorescence photons from the sample which are registered do not yet include highly resolved information but correspond to a conventional confocal image. Thus, a high resolution STED image is only calculated on the basis of the later registered fluorescence photons.

With reference to Auksorius et al., supra, Johanna Buckers et al.: "Simultaneous multi-lifetime multi-color STED imaging for colocalization analyses", OPT. EXPRESS, Vol. 19, No. 4, Feb. 14, 2011, p. 3130-3143 explain that the first photons which are registered in STED-microscopy still include contributions from fluorophores further away from the zero point of the STED beams, i.e. not yet the information of the high spatial resolution.

In Monty Glass et al.: "The experimental effect of detector size on confocal lateral resolution", Journal of Microscopy, Vol. 164, No. 2, Nov. 1, 1991, p. 153-158 it is assumed that a lateral shift between a theoretical and an experimental detector signal in crossing a point reflector may be attributed to a maladjustment of the optical system or the use of real aberrated lenses instead of perfect thin lenses as theoretically presumed.

From Japanese patent application publication JP 2002-277746 A it is known to position a pinhole aperture such that it lets pass a maximum light amount onto a detector. This adjustment of the pinhole aperture is iteratively executed with decreasing diameter of the pinhole aperture.

There still is a need of a method of setting a laser-scanning fluorescence microscope to a correct alignment and a corresponding laser-scanning microscope which allow for a quick and purposeful alignment directly in the focal area of the objective lens and in the fluorescence light imaging mode of the laser-scanning fluorescence light microscope.

SUMMARY OF THE INVENTION

The present invention relates to a method of setting a laser-scanning fluorescence microscope comprising an objective lens to a correct alignment in which an intensity maximum of excitation light and an intensity minimum of fluorescence inhibition light coincide in a focal area of the objective lens. The method comprises scanning a structure in a sample, the structure being marked with a fluorescent dye, with the intensity maximum of the excitation light to generate a first picture and a second picture of the sample, the first picture corresponding to a higher intensity of the fluorescence inhibition light and comprising a first image of the structure, and the second picture corresponding to a lower intensity of the fluorescence inhibition light and comprising a second image of the structure. The method further comprises calculating an offset of a first position of the first image of the structure in the first picture with regard to a second position of the second image of the structure in the second picture; and shifting the intensity maximum of the excitation light with regard to the intensity minimum of the fluorescence inhibition light in the direction of the offset calculated to set the laser-scanning fluorescence microscope to the correct alignment.

Further, the present invention relates to a method of setting a laser-scanning fluorescence microscope comprising an objective lens, a fluorescence light detector and a pinhole aperture arranged in front of the fluorescence light detector to a correct alignment in which a center of an image of the pinhole aperture coincides with an intensity maximum of excitation light. The method comprises scanning a structure in a sample, the structure being marked with a fluorescent dye, with the intensity maximum of the excitation light to generate a first picture and a second picture of the sample, the first picture being generated at a smaller aperture opening of the pinhole aperture and comprising a first image of the structure, and the second picture being generated at a larger aperture opening of the pinhole aperture and comprising a second image of the structure. The method further comprises calculating an offset of a first position of the first image of the structure in the first picture with regard to a second position of the second image of the structure in the second picture; and shifting the intensity maximum of the excitation light with regard to the image of the pinhole aperture in the direction of the offset calculated to set the laser-scanning fluorescence microscope to the correct alignment.

Further, the present invention relates to a method of setting a laser-scanning fluorescence microscope comprising an objective lens, a fluorescence light detector and a pinhole aperture arranged in front of the fluorescence light detector to a correct alignment in which a center of an image of the pinhole aperture coincides with an intensity maximum of excitation light and an intensity minimum of fluorescence inhibition light in a focal area of an objective lens. The method comprises scanning a structure in a sample, the structure being marked with a fluorescent dye, with the intensity maximum of the excitation light to generate a first picture and a second picture of the sample, the first picture corresponding to a higher intensity of the fluorescence inhibition light and comprising a first image of the structure, and the second picture corresponding to a lower intensity of the fluorescence inhibition light and comprising a second image of the structure. The method further comprises calculating an offset of a first position of the first image of the structure in the first picture with regard to a second position of the second image of the structure in the second picture; and shifting the image of the pinhole aperture with regard to the intensity maximum of the excitation light and the intensity minimum of the fluorescence inhibition light in the direction of the offset calculated to set the laser-scanning fluorescence microscope to the correct alignment.

Further, the present invention relates to a laser-scanning fluorescence microscope comprising an excitation light source of excitation light; a fluorescence inhibition light source of fluorescence inhibition light; a fluorescence light detector for fluorescence light; a pinhole aperture arranged in front of the fluorescence light detector; an objective lens focusing the excitation light and the fluorescence inhibition light into a focal area in a sample space and imaging the pinhole aperture into the focal area; and an automatic aligning system configured for setting the laser-scanning fluorescence microscope to a correct alignment in which an intensity maximum of the excitation light, an intensity minimum of the fluorescence inhibition light and the image of the pinhole aperture coincide in the focal area of the objective. The automatic aligning system scans a structure in a sample, the structure being marked with a fluorescent dye, with the intensity maximum of the excitation light to generate at least two pictures of the sample, the at least two pictures corresponding to at least one of different intensities of the fluorescence inhibition light, different aperture openings of the pinhole aperture arranged in front of a fluorescence light detector of the laser-scanning fluorescence microscope, different intensity maxima of several components of the excitation light, different intensity minima of several components of the fluorescence inhibition light, and different images of several pinhole apertures arranged in front of several fluorescence light detectors, and each of the at least two pictures comprising an image of the structure. The automatic aligning system sets the laser-scanning fluorescence microscope to the correct alignment by calculating at least one offset between at least two positions of the images of the structure in the at least two pictures; and by shifting, in the focal area of the objective lens, at least one of the intensity maximum of the excitation light, the intensity minimum of the fluorescence inhibition light and the image of the pinhole aperture image in the direction of the offset calculated.

The terms "picture" and "picture of the sample" as used in this summary and the following description and claims are to be interpreted so broad such that they cover any image (of the sample) in any form. There is no need that the respective image is produced on any surface or screen; it may, for example, be some set of data. The terms "picture" and "picture of the sample" are merely used here to differentiate between the larger image of the sample and the smaller "image of the structure" included therein.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

In the methods of setting a laser-scanning fluorescence microscope to a correct alignment, in which an intensity maximum of excitation light and at least one of an intensity minimum of fluorescence inhibition light and an image of a pinhole arranged in front of a fluorescence light detector coincide in a focal area of an objective lens, wherein a structure in a sample marked with a fluorescent dye is scanned with the intensity maximum of the excitation light in order to generate pictures of the sample including images of the structure, and wherein a metric is calculated from the images of the structure in the pictures, which indicates a deviation from the correct alignment, the generated pictures correspond to at least one of different intensities of the fluorescence inhibition light and different aperture openings of the pinhole aperture, and the metric is an offset between positions of the images of the structure in the generated pictures.

That the generated pictures correspond to different intensities of the fluorescence inhibition light means that a maximum intensity of the fluorescence inhibition light which determines the dimensions of the intensity minimum of the fluorescence inhibition light and thus the spatial resolution achievable due to the fluorescence inhibition light is different and particularly increases with an overall intensity of the fluorescence inhibition light. As a rule, a shape of a spatial intensity distribution of the fluorescence inhibition light including the intensity minimum, which is scaled to a maximum intensity of the fluorescence inhibition, remains the same with all pictures. This, however, is not mandatory as long as the spatial resolution increases with the intensity of the fluorescence inhibition light.

That there is an offset between a confocal image and a STED image of the same structure with a not correctly aligned laser-scanning fluorescence microscopes is generally known from T. J. Gould, et al. (2013), supra. That this offset is suitable as a metric for purposefully setting the corresponding laser-scanning fluorescence microscope to its correct alignment, however, cannot be derived from T. J. Gould, et al. (2013). To the contrary, T. J. Gould, et al. (2013) propose two different metrics for a coarse alignment and a subsequent fine alignment, and these metrics have both to be maximized in the course of the alignment. On the other hand, the metric according to the present disclosure in form of the offset between the positions of the images of the structure in the pictures generated indicates both a direction and a measure of the misalignment of the laser-scanning fluorescence microscope which has to be compensated for to set the laser-scanning fluorescence microscope to its correct alignment. The methods according to the present disclosure do thus not lead to the desired optimum alignment by maximizing a metric in a try and error relocation which requires that a higher number of pictures is generated. Instead, according to the present disclosure, an existing misalignment is quantitatively determined with two, three or similarly few pictures generated and may thus be purposefully compensated for. If, after this compensation, further pictures are generated with at least one of different intensities of the fluorescence inhibition light and different aperture openings of the pinhole aperture, this only serves for checking the alignment achieved using the previously calculated metric.

Further, the methods according to the present disclosure are based on the finding that the metric in form of the offset between the positions of the images of the structure in the generated pictures may also be used for aligning a pinhole aperture arranged in front of the fluorescence light detector, i.e. its image in the focal area of the objective lens, with regard to the intensity maximum of the excitation light in the focal area of the objective lens.

The different intensities of the fluorescence inhibition light and/or the different aperture openings of the pinhole aperture, to which the pictures generated in the methods according to the present disclosure correspond, may particularly include a zero intensity of the fluorescence inhibition light and/or an aperture opening of the pinhole aperture greater than one Airy unit or a complete removal of the pinhole aperture. It is, however, also possible that all of the different intensities of the fluorescence inhibition light and/or of the different aperture openings spatially delimit the fluorescence light registered by the fluorescence light detector, i.e. spatially delimit it to different extents. In any case, at least one of the different intensities of the fluorescence inhibition light or at least one of the different aperture openings to which the pictures generated correspond is so high or so small, respectively, that the fluorescence light detected by the fluorescence light detector is spatially delimited.

In one embodiment of the methods according to the present disclosure, the intensity maximum of the excitation light is shifted or relocated with regard to the intensity minimum of the fluorescence inhibition light in exactly that direction of the offset which the image of the structure comprises in a picture which corresponds to a higher intensity of the fluorescence inhibition light as compared to the image of the structure in another picture which corresponds to a lower intensity of the fluorescence inhibition light.

In one embodiment of the methods according to the present disclosure, the intensity maximum of the excitation light is shifted or relocated with regard to the image of the pinhole in the direction of the offset which the image of the structure in a picture that corresponds to a smaller aperture opening of the pinhole of aperture with regard to the image of the structure in another picture that corresponds to a larger aperture opening of the pinhole aperture.

In one embodiment of the methods according to the present disclosure, the image of the pinhole aperture is shifted or relocated with regard to the intensity minimum of the fluorescence inhibition light in the direction of the offset which the image of the structure has in a picture that corresponds to a higher intensity of the fluorescence inhibition light as compared to the image of the structure in another picture that corresponds to a lower intensity of the fluorescence inhibition light.

The measure by which the intensity maximum of the excitation light or the pinhole, respectively, has to be shifted to achieve the correct alignment depends on the relative widths of the different point spread functions resulting from the different intensities of the fluorescence inhibition light and/or the different aperture openings of the pinhole aperture, or the spatial resolutions achieved in this way. The higher the difference in the widths of the two point spread functions, the closer gets the distance over which the intensity minimum of the excitation light has to be shifted to 1.0 times the offset. For example, a shift by 1.0 times the offset is indicated, if the one of the generated pictures is a confocal picture and the other of the generated pictures is a high resolution STED picture with a high intensity and corresponding small dimensions of a low intensity area of the intensity minimum of the fluorescence inhibition light. On the other hand, a shift by about 2 times the offset is indicated, if the one of the generated pictures is a picture without pinhole aperture and without fluorescence inhibition light and the other of the generated pictures is a confocal picture with a pinhole aperture whose aperture opening corresponds to one Airy unit. In any case, the intensity maximum of the excitation light or the pinhole aperture has to be shifted for achieving the correct alignment exactly in the direction of the offset. The exact measure of the shift or relocation required for achieving the correct alignment depends on the spatial resolution of the structure in the one and the other of the generated pictures and may thus be determined as a function of the different spatial resolutions and/or the different intensities of the fluorescence inhibition light leading to these different spatial resolutions, to which the one and the other generated pictures correspond. The value of this function is at least one, and the particular value may be calculated from a formula describing this function or be taken from a look-up table defining this function on a point by point basis.

It is to be understood that the imaging scale of the laser-scanning fluorescence microscope has to be considered in using the offset calculated as the metric for determining the value of the necessary shift in the focal area of the objective lens.

Each of the embodiments of the methods according to the present disclosure described in the preceding paragraphs uses the higher spatially resolved picture as a point of reference. In a high resolution laser-scanning fluorescence microscope, the picture with the highest intensity of the fluorescence inhibition light and thus with the smallest dimensions of the intensity minimum of the fluorescence inhibition light is the picture with the highest spatial resolution.

Correspondingly, it is suitable to align the excitation light and the pinhole aperture to the fluorescence inhibition light. As, however, a relative alignment of the excitation light and the fluorescence inhibition light and/or the pinhole aperture is essential, the intensity maximum of the excitation light may, for example, also be used as the point of reference. Also in this case, the metric according to the present disclosure may be used for determining the necessary shift of the intensity minimum of the fluorescence inhibition light and/or of the pinhole aperture with regard to both direction and extent.

The methods according to the present disclosure may not only be carried out such that the structure marked with the fluorescent dye is separately scanned with the different intensities of the fluorescence inhibition light and/or the different aperture openings. Instead, the structure in the sample marked with the fluorescent dye may only be scanned once with the intensity maximum of the excitation light, wherein a raw picture is generated in which two pictures of the sample are superimposed that correspond to the different intensities of the fluorescence inhibition light, and wherein both superimposed pictures are then extracted from the raw picture. For example, the raw picture in which the two pictures are superimposed may be generated in that the fluorescence light from the sample is also registered for periods of time with the fluorescence light detector which precede and/or succeed the activity of the fluorescence inhibition light. Thus, the fluorescence light detected by the fluorescence light detector and the picture generated therefrom include portions not influenced by the fluorescence inhibition light which may be extracted from the raw picture in a way which is generally known to those skilled in the art.

Experimentally, a raw picture may be obtained in that, for example, pulses of the fluorescence inhibition light are delayed with regard to pulses of the excitation light. Then, the fluorescence emission prior to the activity of the fluorescence inhibition light contributes the lower spatially resolved picture component, and the fluorescence emission after the activity of the fluorescence inhibition light contributes the higher spatially resolved picture component. Without a temporarily resolved detection, the superimposed raw picture is directly obtained in this case. Alternatively one may use a repetition rate of the pulses of the excitation light which is twice the repetition rate of the pulses of the fluorescence inhibition light so that alternately low spatially resolved and high spatially resolved picture components are generated which sum up to the superimposed raw picture. The superimposed raw picture may be subjected to a (discrete) Fourier transformation (DFT), and the high frequency components may, for example, be removed from the frequency spectrum by multiplication with a Gaussian function. The lowly resolved picture is obtained by back transformation, whereas the highly resolved picture may be calculated as the difference between the lowly resolved picture and the raw picture. The separation of the raw picture into low and high (spatial) frequency components is a standard procedure of electronic image processing which is also established in photo retouching. For the basics it may be referred to the handbooks of image processing (for example R. C. Gonzalez, R. E. Woods, "Digital Image Processing", 3rd Ed., Pearson Education, Inc., Upper Saddle River, N.J., 2008).

The methods according to the present disclosure do not need a special structure which is marked with the fluorescent dye. The methods according to the present disclosure are, however, simplified in that the structure in the sample marked with the fluorescent dye includes fluorescent nanoparticles which are arranged at a higher distance with regard to each other, particularly at a higher distance than the diffraction barrier at the wavelength of the fluorescence light. Then, the methods according to the present disclosure may be based on calculating and compensating for the offset between the images of nanoparticles in the differently generated pictures.

If the structure marked with the fluorescent dye includes a plurality of fluorescent nanoparticles or if the structure marked with the fluorescent dye is any structure in the sample which is not especially prepared for the methods according to the present disclosure, the offset between the positions of the images of the structure in the pictures may be calculated by calculating a cross-correlation between the pictures. The calculation of cross-correlations between pictures belongs to the standard procedures in image processing and image analysis.

In the methods according to the present disclosure the offset between the positions of the images of the structure in the differently generated pictures may also be calculated locally, particularly as a cross-correlation, and correspondingly compensated for locally. This means that—in the methods according to the present disclosure—the laser-scanning fluorescence microscope is not just set to a single global alignment assuming that this alignment remains correct while scanning the sample both with the intensity maximum of the excitation light and the intensity minimum of the fluorescence inhibition light. Instead, any offset between the intensity maximum of the excitation light and the intensity minimum of the fluorescence inhibition light and/or the image of a pinhole aperture in front of the fluorescent light detector may be determined and, if existent, compensated for separately for all different partial areas of the sample which are reached in scanning the sample. For this purpose, an optical element has to be provided which may be operated variably for this compensation in scanning the sample.

The methods according to the present disclosure may also be applied to align a further intensity maximum of further excitation light and/or a further intensity minimum of further fluorescence inhibition light and/or an image of a further pinhole aperture in front of a further fluorescence light detector for a correct alignment with regard to the intensity maximum of the excitation light and the intensity minimum of the fluorescence inhibition light and/or the image of the pinhole aperture in front of the fluorescence detector in the focal area of the objective lens. The further fluorescence inhibition light with the further intensity minimum may have another wavelength than or also have a same wavelength as the fluorescence inhibition light. Even with another wavelength it may serve for delimiting the fluorescence of the same fluorescent dye in another spatial direction and/or in another physical way than the fluorescence inhibition light. If the further excitation light and/or the further fluorescence inhibition light and/or the further fluorescence light detector are assigned to a further fluorescent dye, a further structure in the sample or in a further sample, which is marked with the further fluorescent dye is scanned with the intensity maximum of the further excitation light to generate further pictures of the sample or the further sample with images of the further structure for setting the laser-scanning fluorescence microscope to the correct alignment. Then, an offset between positions of the images of the further structure in the further pictures which correspond to different intensities of the respective fluorescence inhibition light and/or different aperture openings of the respective pinhole aperture is calculated. The intensity maximum of the further excitation light may then be shifted towards the intensity minimum of the fluorescence inhibition light and/or the image of the pinhole aperture in the direction of this offset and by at least 1.0 times this offset.

For setting a further intensity maximum of further excitation light with another wavelength than that one of the excitation light and/or an image of a further pinhole aperture in front of a further fluorescence light detector with another spectral detection region than that one of the fluorescence light detector to a correct alignment with regard to the intensity maximum of the excitation light and/or the image of the pinhole aperture arranged in front of the fluorescence light detector in the focal area of the objective lens a further metric may alternatively be calculated. For this purpose, a structure marked with a single fluorescent dye which is both excitable with the excitation light and with the further excitation light and/or emitting both in the spectral detection region of the fluorescence light detector and in the other spectral detection region of the further fluorescence light detector is scanned with the intensity maximum of the excitation light and/or the further intensity maximum of the further excitation light. The further metric is then calculated as a color channel offset between positions of images of the structure marked with the single fluorescent dye in pictures which correspond to an excitation of the fluorescent dye once with the excitation light and once with the further excitation light and/or which correspond to considering once the fluorescence light registered with the fluorescence light detector and once the fluorescence light registered with the further fluorescence light detector.

The spectral detection region and the other spectral detection region may be continuous, at least one of them may, however, also be discontinuous, i. e. comprise two or more partial spectral detection regions separated by, for example, a notch filter blocking the wavelength of the excitation light.

The "color channel offset" is an offset between positions of images of the structure in different pictures, I, e. a spatial offset between different color channels.

Particularly, the color channel offset may be determined as follows. The structure marked with the single fluorescent dye is one after the other scanned with the excitation light and the further excitation light, wherein the fluorescence light emitted by the fluorescent dye is detected with the fluorescence light detector and/or the further fluorescence light detector. Here, it may be preferred that no pinhole aperture is arranged in front of the fluorescence light detector and/or the further fluorescence light detector yet. The color channel offset between the two pictures once generated with the excitation light and once generated with the further excitation light directly indicates the error in the alignment of the intensity minima of the excitation light and the further excitation light. Generally, the two pictures from which this color channel offset is calculated may also be generated from a raw picture which is generated by simultaneously scanning the structure with the intensity maximum of the excitation light and/or the further intensity maximum of the further excitation light. It is a precondition that the spectral composition of the fluorescence light depends on the excitation light or the further excitation light, respectively, so that due to the ratio of the fluorescence light registered with the fluorescence light detector and the fluorescence light registered with the further fluorescence light detector it may be concluded on whether the fluorescence light is due to an excitation of the fluorescent dye with excitation light or the further excitation light.

To align the pinhole apertures in front of the fluorescence light detector and the further fluorescence light detector with regard to each other it is sufficient to scan the structure with the intensity maximum of the excitation light and/or the further intensity maximum of the further excitation light, if the fluorescence light emitted by the fluorescent dye then falls both in the spectral region of the fluorescence light detector and in the further spectral region of the further fluorescence light detector. In this case, the color channel offset that directly indicates the error of the alignment maybe calculated from the pictures which once consider the fluorescence light registered with the fluorescence light detector and once the fluorescence light registered with the further fluorescence light detector.

If a color channel offset occurs, it can be compensated for by shifting the intensity maximum of the further excitation light or the pinhole aperture in front of the further fluorescence light detector in the direction and by value of the color channel offset to set the laser-scanning fluorescence microscope to the correct alignment.

It is to be understood that in using the color channel offset as a measure for the error of the alignment to be compensated for, the imaging scale of the laser scanning fluorescence microscope has to be considered.

The intensity maximum of the excitation light may be shifted with regard to the intensity minimum of the fluorescence inhibition light and/or to the image of the pinhole aperture in different ways. Shifting and/or tilting an optical element reflecting the excitation light and/or the fluorescence inhibition light and/or the fluorescence light belongs to these ways. Even if the optical element reflects not only the excitation light but also the fluorescence inhibition light and also the fluorescence light it may have different effects due to different wavelengths or polarizations and shift the excitation light, the fluorescence inhibition light and the fluorescence light with regard to each other. A further way of shifting consists of shifting or varying an optical element transmitting and/or pre-focusing and/or aberrating the excitation light and/or the fluorescence inhibition light and/or the fluorescence light. Lenses and phase plates belong to this optical elements. Further, the pinhole aperture may be shifted as such, like for example by a manual or electromotive drive. Further, the operation of adaptive optics, particularly of a spatial light modulator (SLM), a deformable mirror or an MEMS-element which have an effect on the excitation light and/or the fluorescence inhibition light and/or the fluorescence light may be varied.

The methods according to the present disclosure are also suited for setting laser-scanning fluorescence microscopes in which the sample is parallelly scanned with a plurality of intensity maxima of the excitation light and a plurality of associated intensity minima of the fluorescence inhibition light and/or images of pinhole apertures to the correct alignment. Thus, using offsets between positions of the images of structures in pictures which correspond to different intensities of the fluorescence inhibition light and/or different aperture openings of the pinhole aperture, several intensity maxima of the excitation light and several intensity minima of the fluorescence inhibition light and/or images of several pinhole apertures arranged in front of several fluorescence light detectors can be aligned to coincide in the focal area of the objective lens in pairs.

To shift the plurality of intensity maxima of the excitation light with regard to the plurality of intensity minima of the fluorescence inhibition light and/or the images of the pinholes, an optical element splitting up the excitation light and/or the fluorescence inhibition light in partial beams and/or superimposing the partial beams with regard to another may be shifted and/or tilted and/or rotated. Further, an optical element transmitting and/or reflecting the excitation light and/or the fluorescence inhibition light and/or the fluorescence light may be shifted and/or tilted. The shifting and/or tilting may also take place between applying the excitation light and the fluorescence inhibition light to the sample if, like for example in so called RESOLFT fluorescence microscopic methods, sufficient time is available.

The methods according to the present disclosure may be executed in one, two or three spatial dimensions. This means that the intensity maximum of the excitation light may be aligned to coincide with the intensity minimum of the fluorescence inhibition light and/or the image of the pinhole aperture in each spatial direction. For this purpose, it is only necessary that the pictures differently generated in executing the methods according to the present disclosure resolve the respective spatial direction. Thus, two-dimensional pictures, i.e. pictures extending in x- and y-direction do not indicate an offset in z-direction. This offset, however, is found in three-dimensional images as well as in images which extend both in x- or y- and in z-direction.

A laser-scanning fluorescence microscope according to the present disclosure comprises an excitation light source for excitation light, a fluorescence inhibition light for fluorescence inhibition light, a fluorescence light detector for fluorescence light, a pinhole aperture arranged in front of the fluorescence light detector, and an objective lens which focusses the excitation light and the fluorescence inhibition light into a sample space and which images the pinhole aperture into the sample space, and an automatic aligning system. The automatic alignment system aligns an intensity maximum of the excitation light and an intensity minimum of the fluorescence inhibition light as well as the image of the pinhole aperture such that they coincide in a focal area of the objective lens by applying the methods according to the present disclosure.

Figure 1:
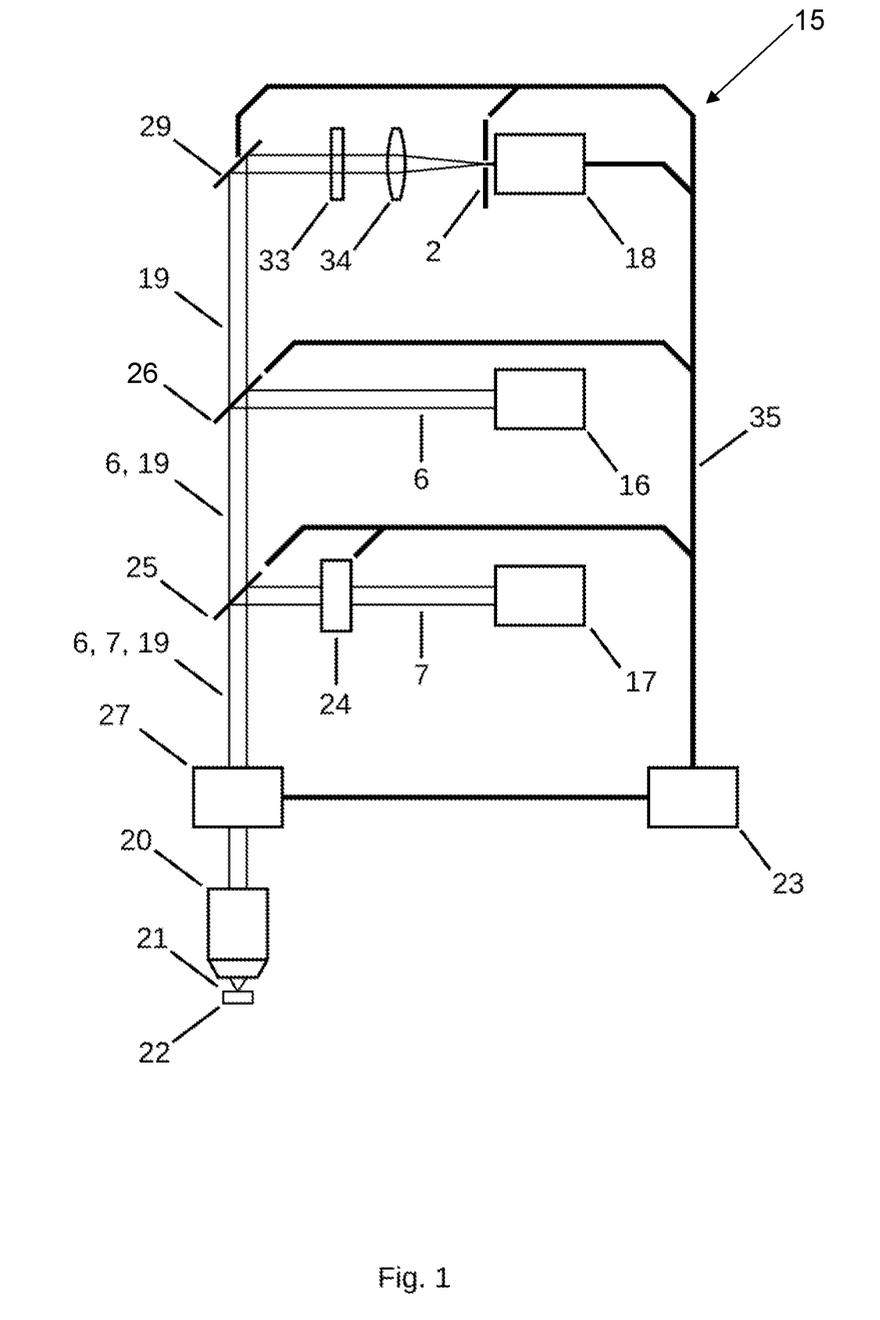
FIG. 1 schematically illustrates a laser-scanning fluorescence microscope according to the invention.

Now referring in greater detail to the drawings, the laser-scanning fluorescence microscope 15 depicted in FIG. 1 comprises an excitation light source 16 providing excitation light 6. The excitation light 6 is deflected by a beam splitter 26 towards a further beam splitter 25. The beam splitter 25 serves for superimposing the excitation light 6 with fluorescence inhibition light 7 coming from a fluorescence inhibition light source 17. A wave front modulator 24 is provided in the beam path of the fluorescence inhibition light 7 between the fluorescence inhibition light source 17 and the beam splitter 25. The excitation light 6 combined with the fluorescence inhibition light 7 is directed through the beam splitter 25, via a scanner 27 and through a focusing objective lens 20 into a sample space 21. A sample 22 is arranged in the sample space 21, the excitation light 6 and the fluorescence inhibition light 7 being focused into a focal area of the objective lens 20 in the sample 22. Fluorescence light 19 emitted out of the sample 22 gets through the objective lens 20, through the scanner 27, through the beam splitters 25 and 26, via a mirror 29, and through a fluorescence light filter 33, through a lens 34 and through a pinhole aperture 2, the lens focusing the fluorescence light 19 onto an aperture opening of the pinhole aperture, onto a fluorescence light detector 18. An automatic aligning system 23 scans the sample 22 to generate pictures of a structure in the sample 22 marked with a fluorescent dye, which correspond to different intensities of the fluorescence inhibition light 7 and/or to different aperture openings of the pinhole aperture 2. The different intensities of the fluorescence inhibition light may correspond to switched on and switched off fluorescence inhibition light 7, respectively, and the different aperture openings of the pinhole aperture may correspond to the active pinhole aperture 2 existing and removed or opened far beyond one Airy unit and thus non-effective pinhole aperture 2, respectively. If there is an offset between the images of the structure in the differently generated pictures, the aligning system 23 corrects this offset by shifting the pinhole aperture 2 or the mirror 29 or by adapting the phase pattern of the wave front modulator 24 or by controlling the scanner 27. Position variations of other optical elements, which may include a tilt and/or a rotation, are also possible in compensating the determined offset by the aligning system 23. Additionally, active or adaptive optics, like for example an SLM, a deformable mirror or an MEMS element may be arranged in the beam path of the excitation light 6 and/or the fluorescence inhibition light 7 and/or the fluorescence light 19 and be controlled by the a aligning system 23 via control/measurement lines 35 for aligning the laser-scanning fluorescence microscope 15.

Figure 2:
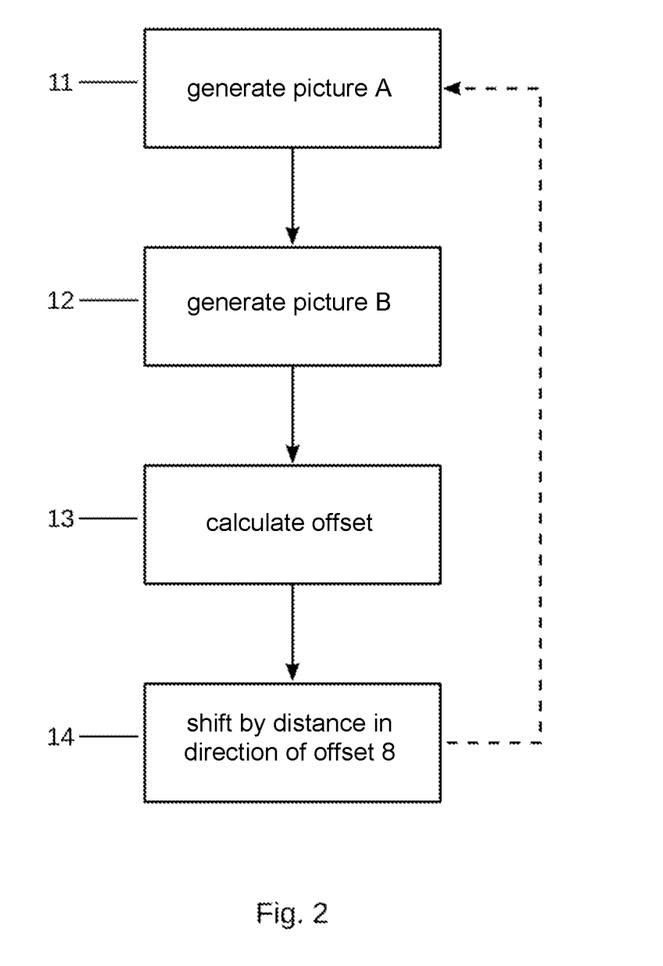
FIG. 2 is a flowchart of an embodiment of the method according to the invention.

FIG. 2 is a flowchart of the method executed by the aligning system 23 according to FIG. 1 for aligning, i.e. for setting the laser-scanning microscope 15 to the correct alignment. In a step 11, a picture A, and in a step 12 a picture B are generated, wherein the pictures A and B differ by different intensities of the fluorescence inhibition light 7 and/or different aperture openings of the pinhole aperture 2. The steps 11 and 12 may include scanning the sample 22 with the excitation light 6 and the fluorescence inhibition light 7 once, only, if the raw picture obtained in this way includes both pictures A and B in separable form. In a step 13, the offset between the images of the structure in the two pictures A and B is calculated. In a step 14, this offset is compensates for in that the intensity distribution of the fluorescence inhibition light 7 or the pinhole aperture 2 are shifted with regard to the excitation light 6 by at least 1.0 times the offset and exactly in the direction of the offset. The exact extent of the shift, which is necessary to compensate for the offset in one step, depends on the ratio of the spatial resolutions of the two pictures A and B.

Figure 3:
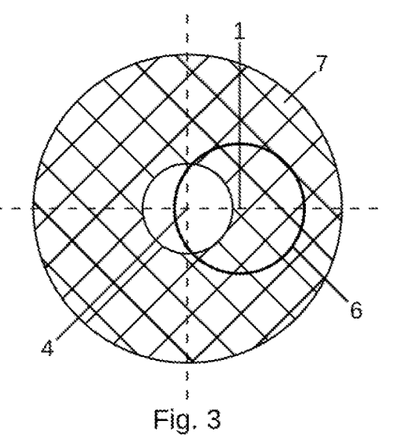
FIG. 3 shows an intensity maximum of excitation light in a sample space of the laser-scanning fluorescence microscope according to FIG. 1, which is misaligned with regard to an intensity minimum of fluorescence inhibition light.
Figure 4:
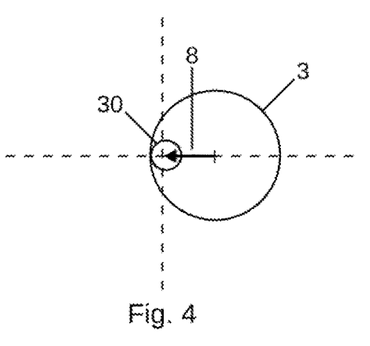
FIG. 4 illustrates an offset between images of a fluorescent nanoparticle in a conventional image and in a high resolution STED image (both taken without or with opened pinhole aperture) due to the misaligned intensity maximum of the fluorescence excitation light according to FIG. 3.
Figure 5:
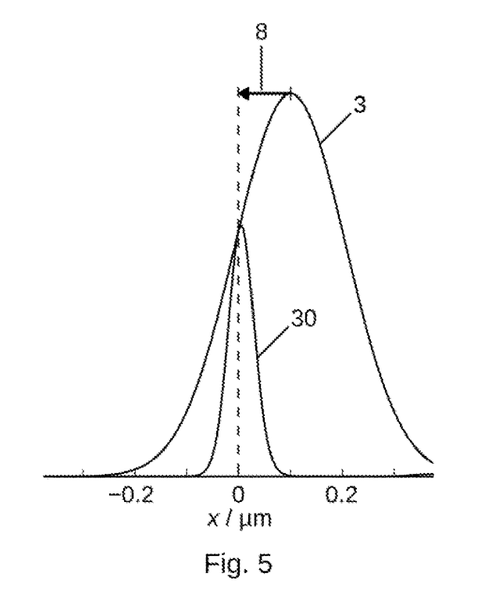
FIG. 5 shows fluorescence light intensity profiles along a horizontal axis of the conventional image and the high resolution STED image according to FIG. 4.

FIG. 3 shows the minimum 4 of the fluorescence inhibition light 7 and the maximum 1 of the excitation light 6 which is here misaligned with regard to the minimum 4 in the sample space 21 around the focus of the objective 20 of the laser-scanning fluorescence microscope 15 according to FIG. 1. The resulting offset 8 of an image 30 of a fluorescent nanoparticle in a highly resolved but not confocally detected picture taken with the laser-scanning microscope 15 according to FIG. 1 with regard to an image 3 of the same nanoparticle in a conventional picture also taken with the laser-scanning fluorescence microscope 15 without confocal detection is depicted in FIG. 4. FIG. 5 shows the same offset by means of the fluorescence light intensity profiles of the images 30 and 3.

Figure 6:
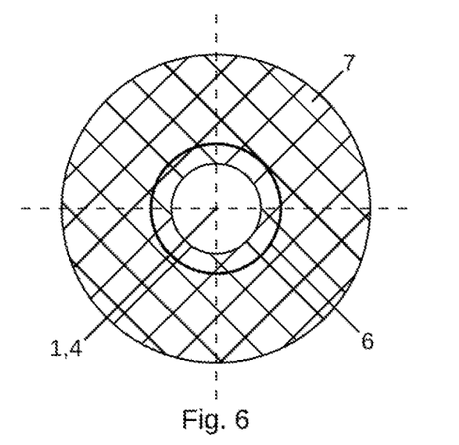
FIG. 6 shows the intensity maximum of the excitation light aligned with the intensity minimum of the fluorescence inhibition light in a depiction corresponding to FIG. 3.
Figure 7:
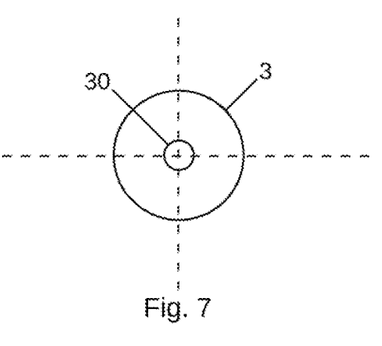
FIG. 7 shows the images of a fluorescent nanoparticle in a conventional image and in a non-confocal high resolution STED image with the aligned intensity maximum of the excitation light according to FIG. 6.
Figure 8:
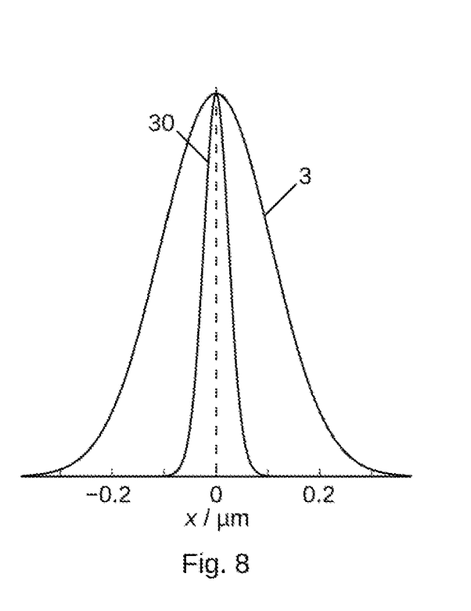
FIG. 8 shows fluorescence intensity profiles along a horizontal axis of the conventional image and the high resolution STED image according to FIG. 7.

If the intensity maximum 1 of the excitation light 6 is now shifted with regard to the intensity minimum 4 of the fluorescence inhibition light 7 in the direction of the offset 8 and by just slightly more than 1 times the offset 8, because the difference between the resolutions of the two pictures of the fluorescent nanoparticles is very high here, the correct alignment depicted in FIG. 6 results, in which the images 3 and 30 concentrally overlap, see FIGS. 7 and 8.

Figure 9:
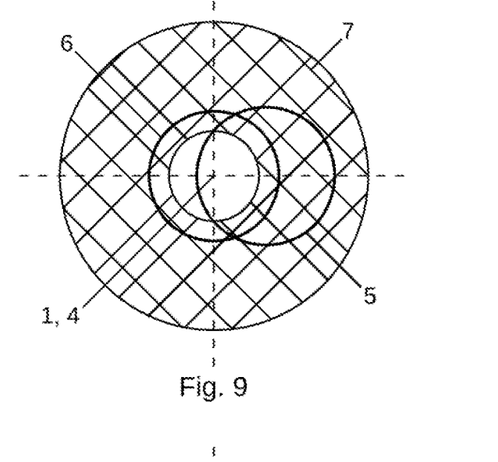
FIG. 9 shows an image of a pinhole aperture in the sample space of the laser-scanning fluorescence microscope according to FIG. 1, which is misaligned with regard to the intensity maximum of the excitation light and the intensity minimum of the fluorescence inhibition light.
Figure 10:
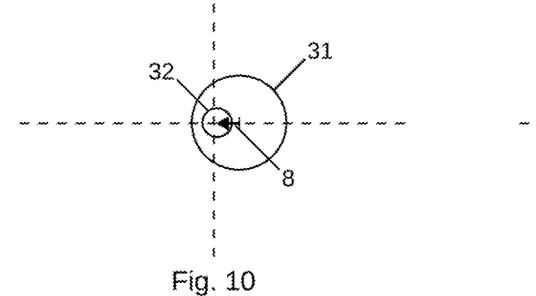
FIG. 10 illustrates an offset between images of a fluorescent nanoparticle in a confocal image and an a high resolution STED image due to the misaligned pinhole aperture according to FIG. 9.
Figure 11:
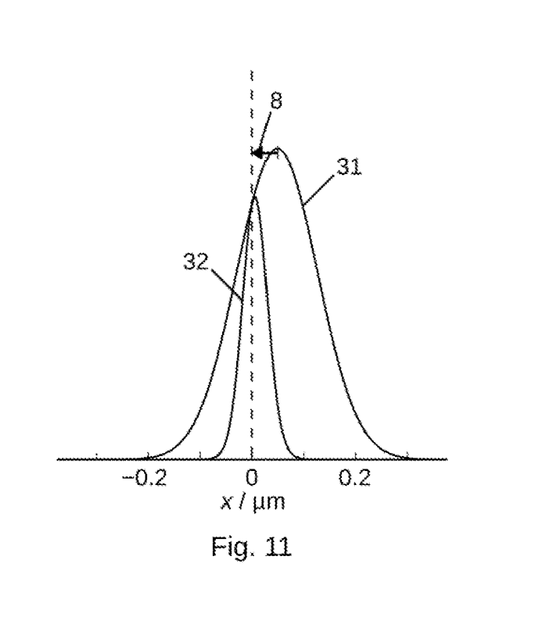
FIG. 11 shows fluorescence light intensity profiles along a horizontal axis of the confocal image and the high resolution STED image according to FIG. 10.

FIG. 9, in addition to FIG. 6, shows an image 5 of the pinhole aperture 2 according to FIG. 1 which is misaligned with regard to the intensity minimum 4 of the fluorescence inhibition light 7 and with regard to the intensity maximum 1 of the excitation light 6, here. This results in the offset depicted in FIG. 10 between an image 32 of a fluorescent nanoparticle in a confocal detected highly resolved picture as compared to an image 31 of the same fluorescent nanoparticle in a confocally detected conventional image without fluorescence inhibition light 7, both taken with the laser-scanning microscope 15 according to FIG. 1. This offset is also found in the fluorescence light intensity profiles of the images 31 and 32 according to FIG. 11. Compared to the quantity by which the image 5 of the pinhole aperture is misaligned with regard to the intensity minimum 4 of the fluorescence inhibition light 7, the offset 8 is smaller here than in case of the misaligned maximum 1 of the excitation light 6 according to FIGS. 1 to 3. This is due to the fact that with confocal detection the difference in spatial resolution between the conventional picture and the highly resolved picture is smaller.

Figure 12:
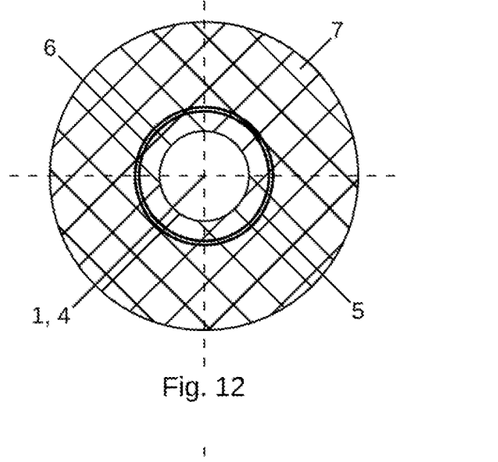
FIG. 12 shows the intensity maximum of the excitation light, the intensity minimum of the fluorescence inhibition light and the image of the pinhole aperture after the alignment, in a depiction similar to FIG. 9.
Figure 13:
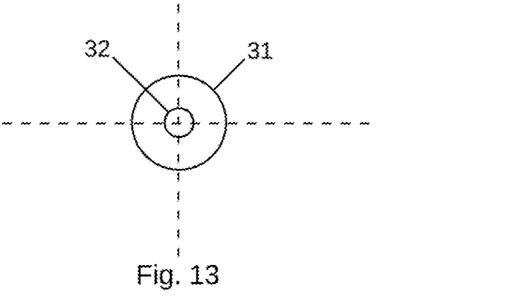
FIG. 13 shows images of a fluorescent nanoparticle in a confocal image and in an STED image but after aligning the pinhole aperture, in a depiction similar to FIG. 10.
Figure 14:
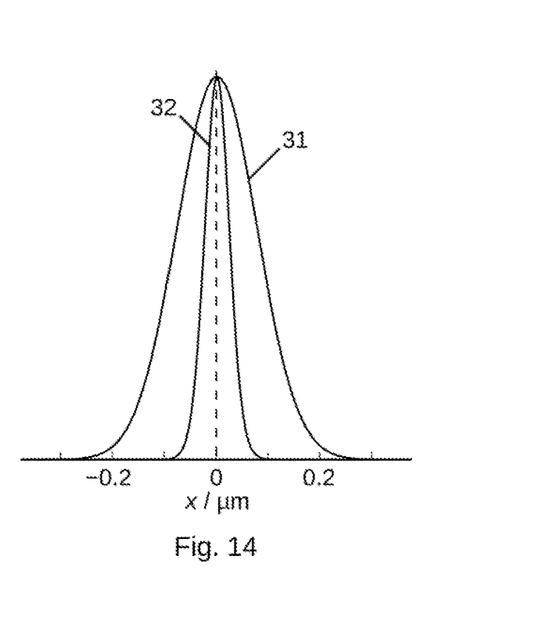
FIG. 14 shows fluorescence light intensity profiles along a horizontal axis of the confocal image and of the high resolution STED image after aligning the pinhole aperture, in a depiction similar to FIG. 11.

As a consequence, the image 5 of the pinhole aperture 2 has to be shifted by essentially more than 1 times the offset 8, wherein the exact quantity depends on the ratio of the spatial resolutions, but once again exactly in the direction of the offset, to remove the misalignment according to FIG. 9 and to get to the aligned condition of the image 5 of the pinhole aperture 2 according to FIG. 12. With a correct alignment of the image 5 of the pinhole, the images 31 and 32 of the same nanoparticle in a conventional and a highly resolved picture both with confocal detection coincide concentrically as shown in FIGS. 13 and 14.

Figure 15:
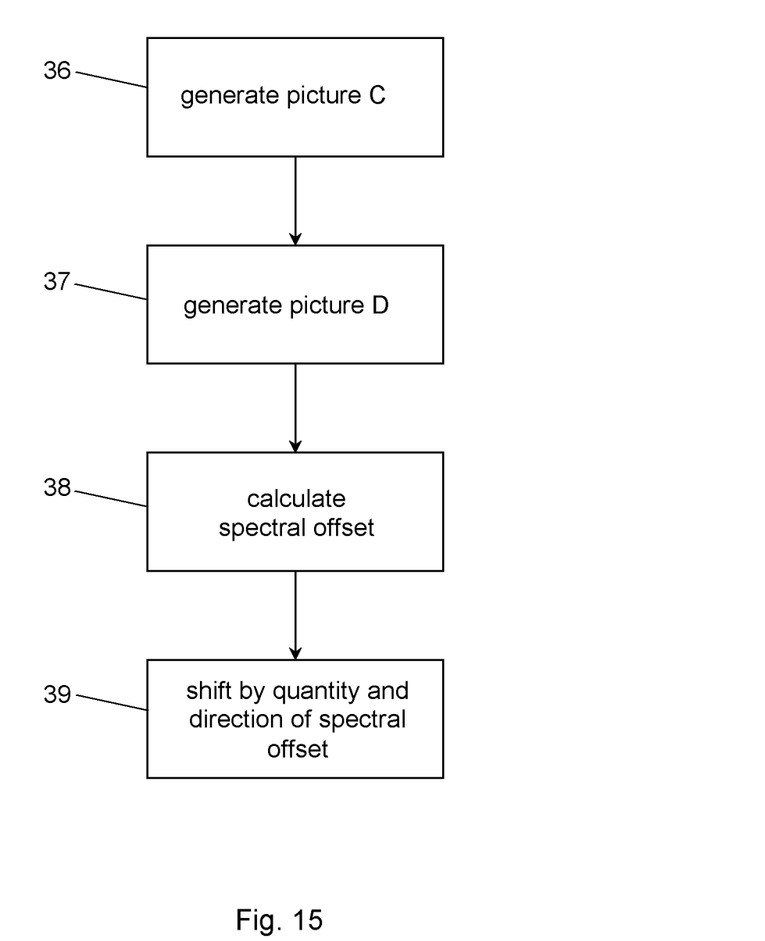
FIG. 15 is a flowchart of a further embodiment of the method according to the invention.

The embodiment of the methods according to the present disclosure illustrated in FIG. 15 by means of a further flowchart starts with a step 36 in which a picture C of a structure of a sample marked with a single fluorescent dye is generated by scanning with the intensity maximum of excitation light of one wavelength. In a following step 37, a further picture D of the same structure is generated, in that the structure is scanned with the intensity maximum of further excitation light of another wavelength, which also excites the fluorescent dye for emission of fluorescence light. Then, in a step 38, a color channel offset is calculated which occurs between the images of the structure of the pictures C and D. This color channel offset corresponds to an error of the relative alignment of the intensity maximum of the excitation light and the intensity maximum of the further excitation light. If, in a following step 39, the intensity maxima of the excitation light and the further excitation light are shifted with regard to each other by the quantity and in the direction of the color channel offset, a correct alignment of the two intensity maxima with regard to each other is achieved.

Using a fluorescent dye both emitting in a spectral detection region of the fluorescence light detector and in another spectral detection region of a further fluorescence light detector, the pictures C and D may be generated by exciting the fluorescent dye with the excitation light or the further excitation light only. The picture C may then be generated of the fluorescence light registered by the fluorescence light detector, whereas the picture D is generated of the fluorescence light registered by the further fluorescence light detector. The color channel offset calculated in step 38 then indicates the error of the alignment between the fluorescence light detectors or between a pinhole aperture arranged in front of the fluorescence light detector and a further pinhole aperture arranged in front of the further fluorescence light detector. This error is to be removed for a correct alignment of the laser-scanning fluorescence microscope in that the further pinhole is shifted with regard to the pinhole in the direction and by the value of the color channel offset.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method of setting a laser-scanning fluorescence microscope comprising an objective lens to a correct alignment in which an intensity maximum of excitation light and an intensity minimum of fluorescence inhibition light coincide in a focal area of the objective lens, the method comprising:
    scanning a structure in a sample, the structure being marked with a fluorescent dye, with the intensity maximum of the excitation light to generate a first picture and a second picture of the sample,
        the first picture corresponding to a higher intensity of the fluorescence inhibition light and comprising a first image of the structure, and
        the second picture corresponding to a lower intensity of the fluorescence inhibition light and comprising a second image of the structure;
    calculating an offset and a direction of the offset of a first position of the first image of the structure in the first picture with regard to a second position of the second image of the structure in the second picture; and
    shifting the intensity maximum of the excitation light with regard to the intensity minimum of the fluorescence inhibition light in the direction of the offset calculated over a distance which is D times the offset calculated to set the laser-scanning fluorescence microscope to the correct alignment, wherein D is a function of different spatial resolutions of the first picture and the second picture or of differences between the higher intensity and the lower intensity of the fluorescence inhibition light leading to the different spatial resolutions of the first picture and the second picture.

2. The method of claim 1, wherein D is at least 1.0.

3. The method of claim 1, wherein the structure in the sample is scanned twice with the intensity maximum of the excitation light, wherein the fluorescence inhibition light is changed between the lower intensity and the higher intensity after scanning the structure for the first time.

4. The method of claim 1,
    wherein the structure in the sample is scanned once with the intensity maximum of the excitation light;
    wherein a raw image is generated in which the first and second pictures of the sample are superimposed in that fluorescence light from the sample is registered for first and second periods of time at different positions in time with regard to an fluorescence inhibition by the fluorescence inhibition light; and
    wherein the first and second pictures are extracted from the raw picture.

5. The method of claim 1, wherein a further intensity maximum of further excitation light with another wavelength than a wavelength of the excitation light is aligned with the intensity maximum of the excitation light in the focal area of the objective lens
    in that the structure marked with the fluorescent dye excitable both with the excitation light and the further excitation light is scanned with the intensity maximum of the excitation light to generate a third picture of the sample and with the further intensity maximum of the further excitation light to generate a fourth picture of the sample,
    in that a further color channel offset of a third position of the third image of the structure in the third picture with regard to a fourth position of the fourth image of the structure in the fourth picture is calculated; and
    in that the intensity maximum of the further excitation light is shifted with regard to the intensity maximum of the excitation light in the direction of the further color channel offset calculated.

6. The method of claim 1, wherein a further intensity minimum of further fluorescence inhibition light having another wavelength than a wavelength of the fluorescence inhibition light is aligned with the intensity maximum of the excitation light and the intensity minimum of the fluorescence inhibition light in the focal area of the objective lens
    in that the structure marked with the fluorescent dye responsive to both the fluorescence inhibition light and the further fluorescence inhibition light is scanned with the intensity maximum of the excitation light to generate a fifth picture and a sixth picture of the sample, the fifth picture corresponding to a higher intensity of the further fluorescence inhibition light and comprising a fifth image of the structure, and the sixth picture corresponding to a lower intensity of the further fluorescence inhibition light and comprising a sixth image of the structure;
    in that a further color channel offset of a fifth position of the fifth image of the structure in the fifth picture with regard to a sixth position of the sixth image of the structure in the sixth picture is calculated; and in that the intensity maximum of the excitation light and the intensity minimum of the fluorescence inhibition light is shifted with regard to the intensity minimum of the fluorescence inhibition light in the direction of the further color channel offset calculated.

7. The method of claim 1, wherein the structure marked with the fluorescent dye includes fluorescent nanoparticles.

8. The method of claim 1, wherein the offset of the first position of the first image of the structure in the first picture with regard to the second position of the second image of the structure in the second picture is calculated by calculating a cross-correlation between the first and second pictures.

9. The method of claim 1, wherein the offset of the first position of the first image of the structure in the first picture with regard to the second position of the second image of the structure in the second picture is calculated and compensated for locally.

10. The method of claim 1, wherein at least one further offset between two further positions of further images of the structure in further pictures which correspond to at least one of
different intensities of the fluorescence inhibition light,
different aperture openings of a pinhole aperture arranged in front of a fluorescence light detector of the laser-scanning fluorescence microscope,
different intensity maxima of several components of the excitation light,
different intensity minima of several components of the fluorescence inhibition light, and
different images of several pinhole apertures arranged in front of several fluorescence light detectors
is calculated and used to bring the two further positions of the further images to coincide in the focal area of the objective lens.

11. A method of setting a laser-scanning fluorescence microscope comprising an objective lens, a fluorescence light detector and a pinhole aperture arranged in front of the fluorescence light detector to a correct alignment in which a center of an image of the pinhole aperture and an intensity maximum of excitation light coincide in a focal area of the objective lens, the method comprising:
scanning a structure in a sample, the structure being marked with a fluorescent dye, with the intensity maximum of the excitation light to generate a first picture and a second picture of the sample,
the first picture being generated at a smaller aperture opening of the pinhole aperture and comprising a first image of the structure, and
the second picture being generated at a larger aperture opening of the pinhole aperture and comprising a second image of the structure;
calculating an offset and a direction of the offset of a first position of the first image of the structure in the first picture with regard to a second position of the second image of the structure in the second picture; and
shifting the intensity maximum of the excitation light with regard to the image of the pinhole aperture in the direction of the offset calculated over a distance which is F times the offset calculated to set the laser-scanning fluorescence microscope to the correct alignment, wherein F is a function of different spatial resolutions of the first picture and the second picture or of differences between the smaller aperture opening and the larger aperture opening of the pinhole aperture leading to the different spatial resolutions of the first picture and the second picture.

12. The method of claim 11, wherein F is at least 1.0.

13. The method of claim 11, wherein the structure in the sample is scanned twice with the intensity maximum of the excitation light, wherein the aperture opening of the pinhole aperture is changed between the smaller aperture opening and the larger aperture opening after scanning the structure for the first time.

14. The method of claim 11, wherein a further image of a further pinhole aperture arranged in front of a further fluorescence light detector having another spectral detection region than a spectral detection region of the fluorescence light detector is aligned with at least one of the intensity maximum of the excitation light and the image of the pinhole aperture in the focal area of the objective lens
in that the structure marked with the fluorescent dye emitting both in the spectral detection region of the fluorescence detector and in the other spectral detection region of the further fluorescence light detector is scanned with the intensity maximum of the excitation light to generate a third picture of the sample using fluorescence light registered with the fluorescence light detector and a fourth picture of the sample using the fluorescence light registered with the further fluorescence light detector,
in that a further color channel offset of a third position of the third image of the structure in the third picture with regard to a fourth position of the fourth image of the structure in the fourth picture is calculated; and
in that the image of the further pinhole aperture is shifted in the direction of the further color channel offset calculated.

15. The method of claim 11, wherein at least one further offset between two further positions of further images of the structure in further pictures which correspond to at least one of
different intensities of the fluorescence inhibition light,
different aperture openings of the pinhole aperture,
different intensity maxima of several components of the excitation light,
different intensity minima of several components of the fluorescence inhibition light, and
different images of several pinhole apertures arranged in front of several fluorescence light detectors
is calculated and used to bring the two further positions of the further images to coincide in the focal area of the objective lens.

16. The method of claim 11, wherein a further intensity maximum of further excitation light with another wavelength than a wavelength of the excitation light is aligned with the intensity maximum of the excitation light in the focal area of the objective lens
in that the structure marked with the fluorescent dye excitable both with the excitation light and the further excitation light is scanned with the intensity maximum of the excitation light to generate a fifth picture of the sample and with the further intensity maximum of the further excitation light to generate a sixth picture of the sample,
in that a further color channel offset of a fifth position of the fifth image of the structure in the fifth picture with regard to a sixth position of the sixth image of the structure in the sixth picture is calculated; and
in that the intensity maximum of the further excitation light is shifted with regard to the intensity maximum of the excitation light in the direction of the further color channel offset calculated.

17. A method of setting a laser-scanning fluorescence microscope comprising an objective lens, a fluorescence light detector and a pinhole aperture arranged in front of the fluorescence light detector to a correct alignment in which a center of an image of the pinhole aperture coincides with an intensity maximum of excitation light and an intensity minimum of fluorescence inhibition light in a focal area of an objective lens, the method comprising:
- scanning a structure in a sample, the structure being marked with a fluorescent dye, with the intensity maximum of the excitation light to generate a first picture and a second picture of the sample,
  - the first picture corresponding to a higher intensity of the fluorescence inhibition light and comprising a first image of the structure, and
  - the second picture corresponding to a lower intensity of the fluorescence inhibition light and comprising a second image of the structure;
- calculating an offset and a direction of the offset of a first position of the first image of the structure in the first picture with regard to a second position of the second image of the structure in the second picture; and
- shifting the image of the pinhole aperture with regard to the intensity maximum of the excitation light and the intensity minimum of the fluorescence inhibition light in the direction of the offset calculated over a distance which is G times the offset calculated to set the laser-scanning fluorescence microscope to the correct alignment, wherein G is a function of different spatial resolutions of the first picture and the second picture or of differences between the higher intensity and the lower intensity of the fluorescence inhibition light leading to the different spatial resolutions of the first picture and the second picture.

18. The method of claim 17, wherein G is at least 1.0.

19. The method of claim 17, wherein at least one further offset between two further positions of further images of the structure in further pictures which correspond to at least one of
- different intensities of the fluorescence inhibition light,
- different aperture openings of the pinhole aperture,
- different intensity maxima of several components of the excitation light,
- different intensity minima of several components of the fluorescence inhibition light, and
- different images of several pinhole apertures arranged in front of several fluorescence light detectors is calculated and used to bring the two further positions of the further images to coincide in the focal area of the objective lens.

20. A laser-scanning fluorescence microscope comprising
an excitation light source of excitation light;
a fluorescence inhibition light source of fluorescence inhibition light;
a fluorescence light detector for fluorescence light;
a pinhole aperture arranged in front of the fluorescence light detector;
an objective lens focusing the excitation light and the fluorescence inhibition light into a focal area in a sample space and imaging the pinhole aperture into the focal area; and
an automatic aligning system configured for setting the laser-scanning fluorescence microscope to a correct alignment in which an intensity maximum of the excitation light, an intensity minimum of the fluorescence inhibition light and the image of the pinhole aperture coincide in the focal area of the objective,
- by scanning a structure in a sample, the structure being marked with a fluorescent dye, with the intensity maximum of the excitation light to generate at least two pictures of the sample, the at least two pictures corresponding to at least one of
  - different intensities of the fluorescence inhibition light,
  - different aperture openings of the pinhole aperture arranged in front of a fluorescence light detector of the laser-scanning fluorescence microscope,
  - different intensity maxima of several components of the excitation light,
  - different intensity minima of several components of the fluorescence inhibition light, and
  - different images of several pinhole apertures arranged in front of several fluorescence light detectors, and each of the at least two pictures comprising an image of the structure;
- by calculating at least one offset and a direction of the at least one offset between at least two positions of the images of the structure in the at least two pictures; and
- by shifting, in the focal area of the objective lens, at least one of the intensity maximum of the excitation light, the intensity minimum of the fluorescence inhibition light and the image of the pinhole aperture image in the direction of the at least one offset calculated over a distance which is H times the offset calculated, wherein H is a function of spatial resolutions of the at least two pictures.

21. The laser-scanning fluorescence microscope of claim 20, wherein H is at least 1.0.

* * * * *